No. 868,341. PATENTED OCT. 15, 1907.
A. H. HOLDEN.
CENTRIFUGAL SEPARATOR FOR WOOD PULP AND SIMILAR MATERIALS.
APPLICATION FILED MAR. 22, 1907.

Witnesses
A. E. Camburn
Myron F. Clear

Inventor
A. H. Holden,
by C. L. Parker
His Attorney

UNITED STATES PATENT OFFICE.

ANDREAS HANSEN HOLDEN, OF LÅNGED, SWEDEN.

CENTRIFUGAL SEPARATOR FOR WOOD-PULP AND SIMILAR MATERIALS.

No. 868,341.　　　　Specification of Letters Patent.　　　　Patented Oct. 15, 1907.

Application filed March 22, 1907. Serial No. 363,835.

*To all whom it may concern:*

Be it known that I, ANDREAS HANSEN HOLDEN, a subject of the King of Sweden, residing at Långed, Sweden, have invented certain new and useful Improvements in Centrifugal Separators for Cellulose, Wood-Pulp, and other Similar Materials, of which the following is a specification.

My invention relates to centrifugal separators, and the object thereof is to provide a simple and improved arrangement for the separation of cellulose, wood pulp, and other similar materials.

Figure 1:
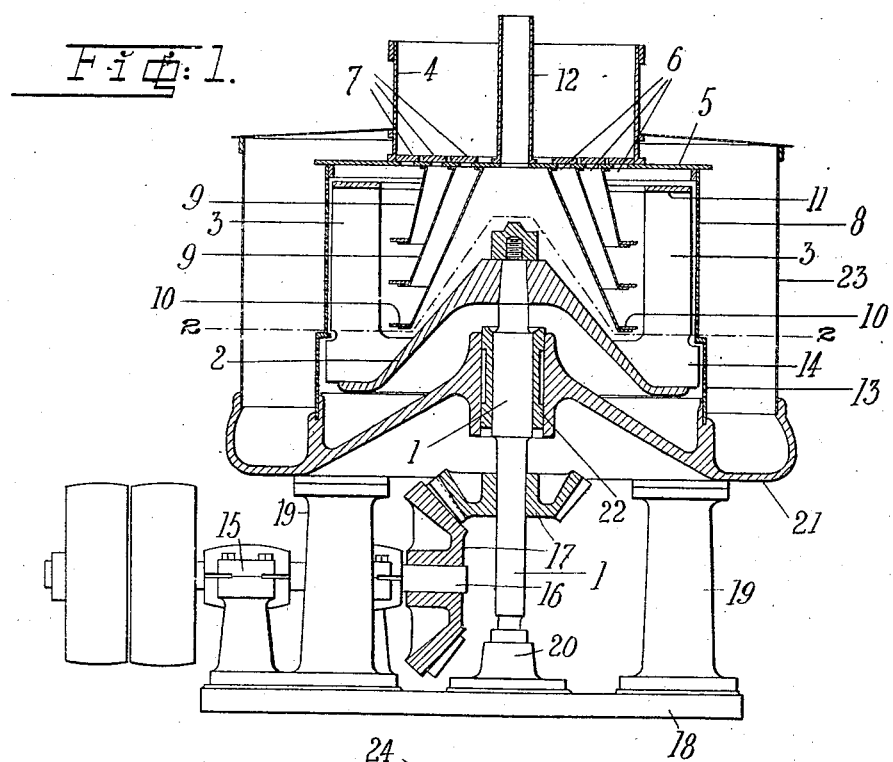
Figure 2:
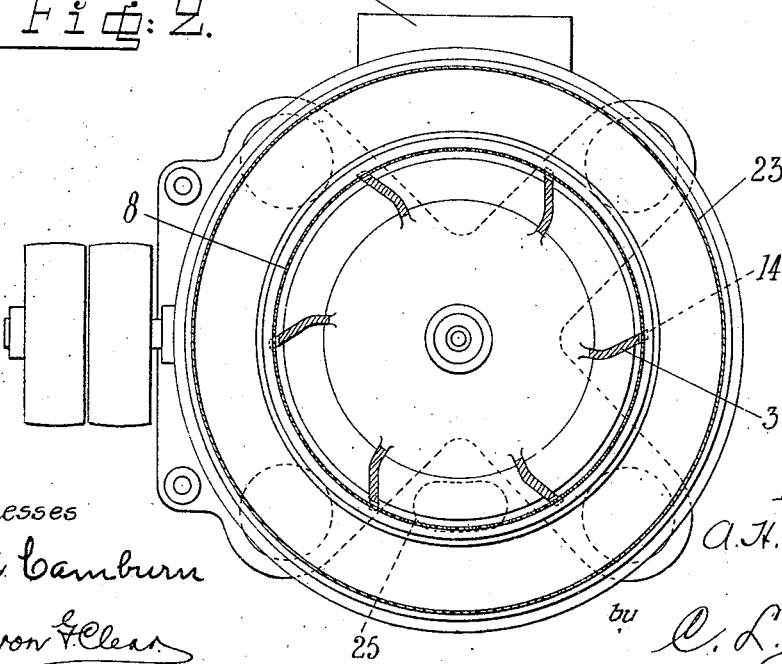

My invention resides in the following features of construction and arrangement as hereinafter described and pointed out in the accompanying drawings, in which, Figure 1 is a vertical sectional view through my improved separator, and Fig. 2 is a longitudinal section therethrough on the line 2—2 of Fig. 1.

In the practical embodiment of my invention I provide a horizontal driving shaft 16, mounted in suitable bearings 15, and provided with pulleys by which the same may be driven from any suitable source of power. The bearings 15 are mounted on the separator bed-plate 18, which also supports the four columns 19, and the end bearing 20 for the vertical separator shaft 1, driven from the shaft 16 by means of the bevel gears 17. On the columns 19 is mounted the separator base 21, carrying the outer casing 23 and the inner perforated casings 13 and 8. Mounted on the upper end of the shaft 1 within the separator is the rotating beating element comprising the basin-shaped base 2, provided with radially disposed curved blades or vanes extending upwardly therefrom, and provided with lower widened portions 14 and upper narrowed portion 3.

A perforated casing 8 is mounted about the portions 3 of said blades or vanes, and is provided with a cover 5 having openings 6 therethrough arranged on concentric circles beneath the hopper 4. The hopper 4 is provided with a subbottom 7, having a series of openings therethrough, and adapted to be slightly turned to partially or completely close the opening 6 in the cover 5. Arranged beneath the cover 5 are a series of conical downwardly extending plates 9, conducting between themselves the material from the openings 6 to the rotating blades or vanes, and being for this purpose provided with horizontal edges 10.

Arranged about the widened portion 14 of the rotating blades or vanes is a perforated casing 13 of substantially greater diameter than the casing 8, which surrounds the upper portion of said blades or vanes, said upper portions being further connected to the others within the series by means of the ring-plate 11.

The outer casing 23 and the portion of the separator base 21 outside the casing 13 serve as a receiver of the sorted mass, which may be withdrawn therefrom by means of a discharge 24 shown in Fig. 2. A discharge opening 25 is provided through the base 21 within the circumference of the casings 8 and 13 for the withdrawal of the waste, as also shown in Fig. 2.

The operation of my improved separator is as follows: When the machine is started and the water turned on through the pipe 12 the mass of material is conducted downwardly from the hopper 4 through the openings 6 and through the plates 9 onto and between the blades or vanes 3, at different heights, and by this means the mass is evenly distributed or beaten upon the surface of the perforated cylinder 8. The water entering through the pipe 12 flows downwardly upon the basin-shaped base 2, and dissolves and separates the mass of thicker material, falling down from the perforated casing 8, and the lower portions 14 of the blades or vanes being wider than the upper portions 3 as previously described, the said portions 14 will seize the mass and beat the same outward against the second perforated cylinder 13. The mass is thus subjected first to a beating and then to the action of a liquid dissolvent, and then to a second beating instead of going to waste after the first beating, as is usual.

It will be readily seen from the foregoing that I am able to evenly distribute the material over the perforated cylinders, and that I am able to better separate the mass and to obtain more sorted mass and less waste than usual.

Having fully described my invention I claim:

1. In a centrifugal separator, the combination of a hopper, provided with openings at the bottom thereof, a rotating element provided with radially disposed curved blades or vanes extending upwardly therefrom, and provided with widened lower portions, means for guiding the material from said hopper onto and between the upper portions of said vanes, a perforated cylinder or casing arranged about the upper portions of said vanes, and a second perforated casing of increased diameter arranged about the lower widened portions of said vanes, substantially as described.

2. In a centrifugal separator, the combination of a hopper provided with openings at the bottom thereof, a rotating element provided with radially disposed curved blades or vanes extending upwardly therefrom, and provided with widened lower portions, a plurality of conical plates arranged beneath said hopper to convey the material at different heights onto and between the upper portions of said blades or vanes, a perforated casing arranged about said upper portions of said vanes, and a second perforated cylinder of increased diameter arranged about the lower widened portions of said vanes, substantially as described.

3. In a centrifugal separator, the combination of a hopper provided with openings at the bottom thereof, a rotating element provided with radially disposed curved blades or vanes extending upwardly therefrom and connected together at their upper ends and provided with widened lower portions, a plurality of conical plates arranged beneath said hopper to convey the material at different heights onto and between the upper portions of said blades or vanes, said plates being provided with lower horizontal edges, a perforated casing arranged about the upper portions of said vanes, and a second perforated casing of increased diameter arranged about the lower widened portions of said vanes, substantially as described.

4. In a centrifugal separator, the combination of a hopper provided with openings at the bottom thereof, a rotating beating wheel comprising a base-plate and a plurality of radially disposed curved blades or vanes extending upwardly therefrom and connected together at their upper ends and provided with widened lower portions, a plurality of conical plates arranged beneath said hopper and adapted to convey between themselves the material from said hopper and to deliver the same at different heights onto and between the upper portions of said blades or vanes, a perforated casing arranged about said upper portions of said vanes, and a second perforated casing of increased diameter arranged about the lower widened portions of said vanes, substantially as described.

In testimony whereof I affix my signature in presence of two witnesses.

ANDREAS HANSEN HOLDEN.

Witnesses:
EMIL LJOBERG,
DAVID AECIR.